Jan. 26, 1937.   G. E. DEMOREST   2,068,662
SELF ALIGNING PICTURE BAIL
Filed April 24, 1933   2 Sheets-Sheet 1

INVENTOR.
GEORGE E. DEMOREST.
BY

Jan. 26, 1937. G. E. DEMOREST 2,068,662
SELF ALIGNING PICTURE BAIL
Filed April 24, 1933 2 Sheets-Sheet 2
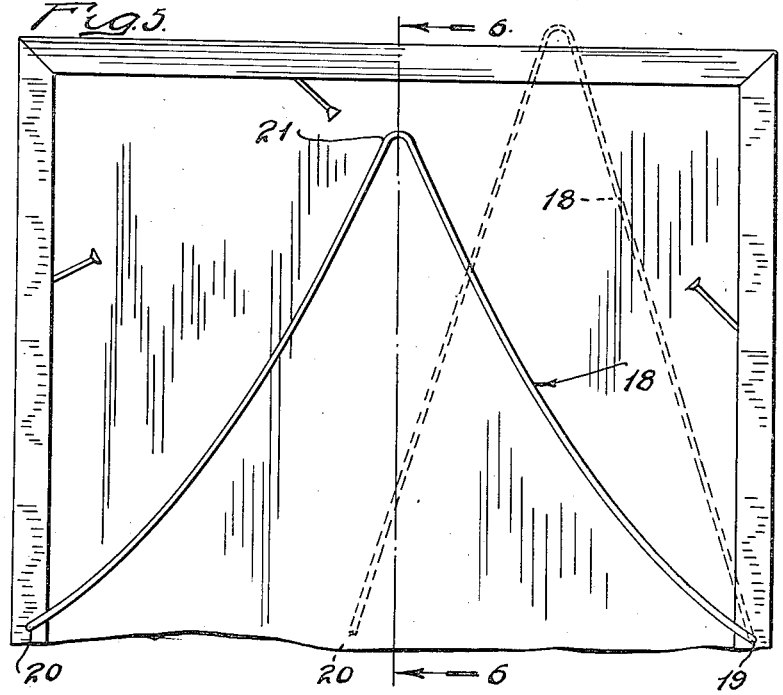
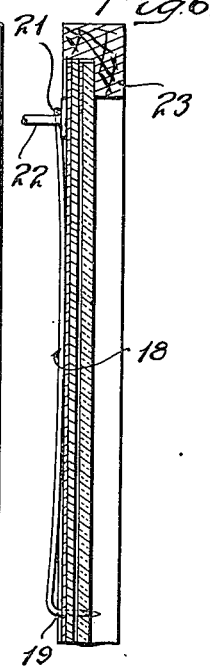
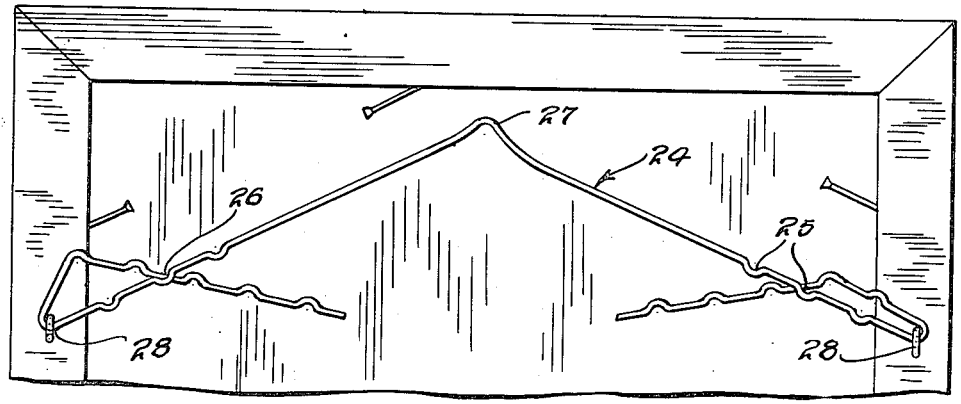
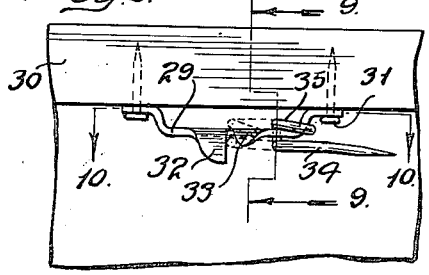
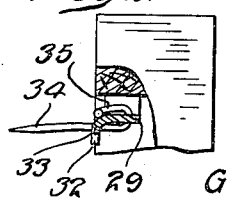
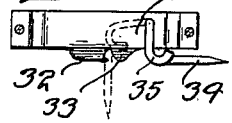
INVENTOR.
GEORGE E. DEMOREST.
BY
Barnes, Kisselle & Laughlin
ATTORNEYS.

Patented Jan. 26, 1937

2,068,662

UNITED STATES PATENT OFFICE 2,068,662

SELF-ALIGNING PICTURE BAIL

George E. Demorest, Flint, Mich.

Application April 24, 1933, Serial No. 667,581

8 Claims. (Cl. 248—28)

This invention relates to a self-aligning picture bail, and has to do particularly with an extremely simple supporting unit adapted to be very easily attached to a standard picture frame.

Heretofore in the hanging of pictures and the like, many forms of bails have been provided and some of these shaped to self-align the picture have required special attachments for connecting the bail to the picture or have required special fabrication of the back of the picture frame for attachment, such as shown in Patents No. 153,789 of August 4, 1874 and 1,485,281 of February 26, 1924.

It is the main object of the present invention to provide a single piece bail, the connecting part of the bail being so fabricated as to be directly secured to any type of surface.

One particular form of the invention contemplates a bail, the ends of which are turned in at right angles to the plane of the bail to form attaching members and the bail itself is so fabricated relative to said attaching members as to form a self-centering bail regardless of the positive heights of the attaching members on either side of the picture.

A further feature of the present invention resides in the combination of a bail and right angular prongs whereby when the bail has been directly attached to the frame, the shape of the bail and the inherent resiliency thereof will maintain the same flat against the back of the picture whereby when the picture is hung the bail will contact with the back of the nail or the like and keep the picture flat against the wall or at least against the nail or other fastening means.

Other features including details of construction, arrangement and modifications thereof will be more clearly set forth in the specification and claims.

In the drawings:

Fig. 5 is an elevation of a slightly modified form of self-aligning bail showing the same extended in the solid lines and in normal position in dotted lines.

Fig. 6 is a sectional view taken on line 6—6 of Fig. 5, illustrating the resiliency or tension set up between the bail, supporting means and the frame.

Fig. 7 is an elevation of a further modified form wherein the self-centering is taken care of by linked ends of the bail.

Fig. 8 is an elevation of a further modified self-centering bail wherein the fastening means designed to be tacked on the wall is formed as a part of the bail.

Fig. 9 is a sectional view taken on line 9—9 of Fig. 8 and showing the fastening means extended to supporting position.

Fig. 10 is a plan view taken on line 10—10 of Fig. 8 showing the fastening means in folded back position in solid lines and extended fastening position in dotted lines.

Figure 1:
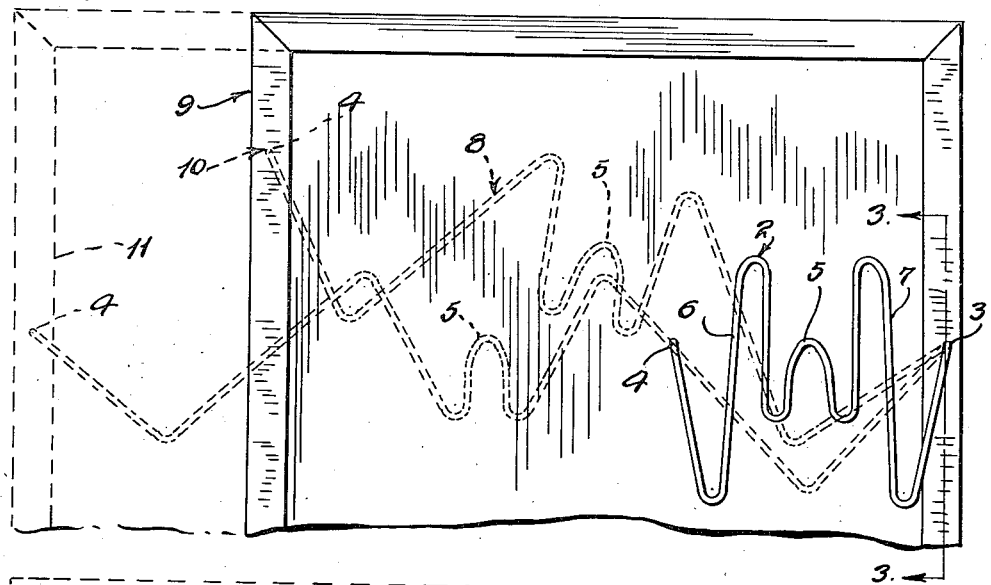
Fig. 1 is an elevation of my preferred form of self-aligning picture bail and showing the same in different degrees of extension and position in dotted lines.
Figure 2:
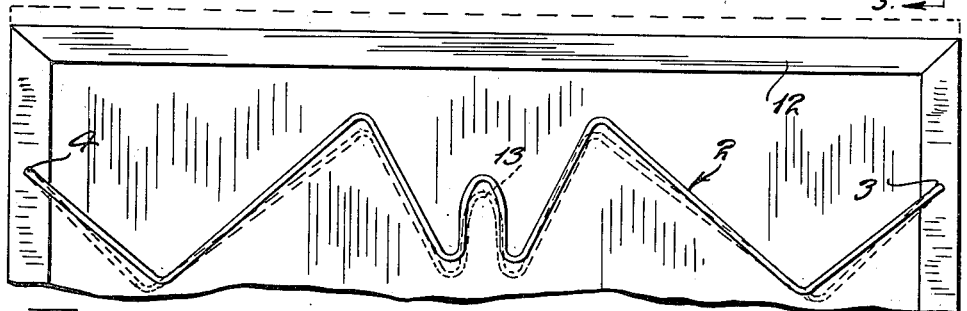
Fig. 2 is an elevation illustrating the manner of all center alignment of the bail to take care of relatively heavy pictures.

The preferred form of my self-centering bail is illustrated in Figs. 1 and 2 and may be generally designated 2. This bail is preferably formed of a length of spring steel wire or any other form of wire that will retain a reasonable amount of spring tension. Each end of this bail is turned in at right angles to form tack members 3 and 4 and the center portion 5 of the bail, or that portion adapted to contact with the supporting nail or means, is so formed as to be in alignment with the tack members 3 and 4. The portions 6 and 7 intermediate the line points 3, 5, and 4 are of serpentine or other offset formation so as to permit relatively great extension of the bail to fit different widths of pictures.

The bail 2, as shown in solid lines in Fig. 1, is normally of such form as to fit a relatively small picture. However, this bail may be extended as indicated by the dotted lines 8 so as to be used for supporting a picture 9. The operator, in adapting the bail to the picture 9 or to any picture, regardless of its width, merely forces home the tack 3 at a point substantially central of the frame and then, grasping the point 4, moves the same to the opposite frame of the picture, for instance, to a point 10. The operator need pay no particular attention to the relative height at which the points 3 and 4 are tacked to the frame because inasmuch as the points 3, 5 and 4 are in alignment, the center portion 5 of the bail will always be colinear with the vertical axis of the frame. The bail may be even further extended when used in connection with a still wider frame 11.

Figure 3:
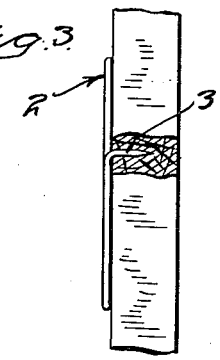
Fig. 3 is a section taken on line 3—3 of Fig. 1.

In case the bail 2 is to be used with a relatively heavy picture, such as shown at 12 in Fig. 2, the normal center portion is formed somewhat below the line between points 3 and 4, such as shown at 13 in dotted lines. The weight of the picture will then raise the bail to the position shown in solid lines so that the three points will be in alignment when in operable position. The turning in of the tack portions 3 at right angles to the plane of the bail and the formation of the bail sets up a spring tension so that the bail is held flat against the frame as best shown in Fig. 3.

Figure 4:
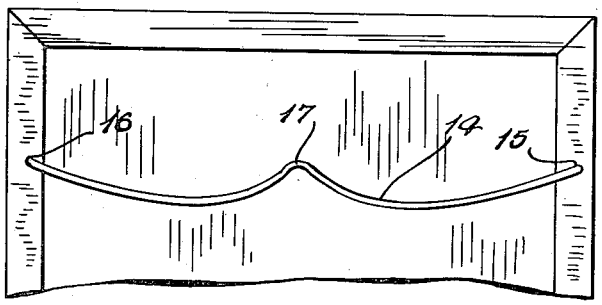
Fig. 4 is an elevation of a modified form of self-aligning bail of the type adapted to fit a certain size picture frame.

A modified form of self-centering bail is shown at 14 in Fig. 4, the tack portions 15 and 16 of this bail are in alignment with the center portion 17 but there is no serpentine formation and such a bail would be limited to substantially a certain size of picture frame. The inherent spring tension of the bail in the form shown in Figs. 1 to 4 is such that the center portion 5 or 17 may contact with the back of the nail or other fastening means to hold the picture flat against the wall and to positively maintain the same in central position.

In the modification shown in Figs. 5 and 6 I have shown another one piece bail 18 wherein the ends 19 and 20 are turned in to form tack portions. The center portion 21 of this bail 18 is preferably positioned some distance above the tacks 19 and 20 so as to give considerable range of adaptability, the normal position of the bail being shown in dotted lines. In the securing of the bail to the frame, the operator will have to keep the points 19 and 20 substantially at the same level. When the tacks 19 and 20 are pressed into place, as best shown in Fig. 6, then the spring tension of this tack form of bail will result in the portion 21 hugging the back of the tack or nail 22 and thus keeping the picture 23 up against the wall or up against the tack 22. This same spring tension causing the frame to be held against the wall of the tack will also insure the frame as being maintained in the self-centering position.

In the modification shown in Fig. 7, the single piece bail 24 is provided with notches 25 and 26 which are equidistantly spaced from the center portion 27 and from each other. The ends of the bail may be bent at any notch so that the selected notches 25 and 26 will be maintained in fixed position relative to the fastening means 28.

A further modified form is shown in Figs. 8, 9, and 10 wherein a sort of bail 29 may be secured to the frame 30 by suitable fastening means 31. This bail or fixture is provided with a stub 32 and a cam member 33 both adapted to cooperate with a tack member 34 pivotally mounted within the fixture or bail 29. This tack member 34 is provided with a reverse loop portion 35 which is spaced from the tack 34 a distance less than the width of the cam 33. Thus, normally, the tack 34 will be swung out of position, such as that shown in Figs. 8 and 10, so it will be easily shipped, packed and handled. When the picture is to be hung it is only necessary to swing the tack 34 about its pivot or by the loop portion 35 and tack 34 will be swung apart by the cam 33, but as soon as the tack 34 passes the cam 33 the tack will be held in central position between the stub 32 and the cam 33 as best shown in Figs. 8 and 10. This central operative position of the tack 34 is in alignment with the vertical axis of the frame with the result that the tack may be readily pushed into the wall and the frame held in central position flat against the wall, the resiliency set up between the tack portion 35 and the bail holding the frame positively in central position.

Thus, in either the form shown in Figs. 1 to 4, 5, 6 and 8 to 10, the tension set up between the bail, the frame, and the supporting means will tend to positively maintain the picture in central or level position.

In forming the tack ends such as shown at 3, 4, 19, 20 and 34, I preferably subject a length of wire to be used to some localized heating medium such as electrodes, and when the wire becomes sufficiently heated at the localized point, two pieces of wire are drawn apart thus automatically drawing a heated portion of the wire to a point. The two pointed portions of the wire may be then immersed or otherwise suitably tempered.

What I claim is:

1. As a new article of manufacture, a self-centering bail for pictures and the like, comprising a central seat portion shaped to receive a supporting means, and two end portions, for connection to the frame, and in alignment with said central portion, portions of the bail intermediate the central portion and two ends being offset to permit extension of the bail to fit different sized frames.

2. In combination with a frame and supporting means, a self-centering bail comprising a single length of wire having two ends bent over to form tack members and a central seat portion in colinear alignment with and intermediate the tack portions, said bail setting up a tension relative to said frame and supporting means whereby to draw the frame towards the supporting means and maintain the same in central position, the portions of the bail intermediate the end portions and the central portion being so fabricated as to permit relative movement between the end portions to adapt the bail to different widths of pictures.

3. In combination with a frame and supporting means, a self-centering bail comprising a single length of wire having two ends bent over to form tack members and a central seat portion in colinear alignment with and intermediate the tack portions, said tack portions being turned in at right angles to the plane of the bail, said bail setting up a tension relative to said frame and supporting means whereby to draw the frame towards the supporting means and maintain the same in central position, the portions of the bail intermediate the end portions and the central portion being so fabricated as to permit relative movement between the end portions to adapt the bail to different widths of pictures.

4. In combination with a frame and supporting means, a self-centering bail comprising a single length of wire having two ends forming tack members and a central seat portion in colinear alignment with and intermediate the tack portions, said bail setting up a tension relative to said frame and supporting means whereby to draw the frame towards the supporting means and maintain the same in central position, the portions of the bail intermediate the end portions and the central portion being of greater length than a straight line through the end portions and central portion and so fabricated as to permit relative movement between the end portions to adapt the bail to different widths of pictures and still maintaining the two end portions and the central portion in alignment whereby the end portions may be connected to the side frames of the picture at any desired points and still maintain the center of the bail colinear with the vertical axis of the frame.

5. In combination with a frame and supporting means, a self-centering bail comprising a single length of wire having two ends bent over to form tack members and a central seat portion in colinear alignment with and intermediate the tack portions, said tack portions being turned in at right angles to the plane of the bail, said bail setting up a tension relative to said frame and supporting means whereby to draw the frame towards the supporting means and maintain the same in central position, the portions of the bail intermediate the end portions and the central portion being of greater length than a straight line through the end portions and central portion and so fabricated as to permit relative movement between the end portions to adapt the bail to different widths of pictures and still maintaining the two end portions and the central portion in alignment whereby the end portions may be connected to the side frames of the picture at any desired points and still maintain the center of the bail colinear with the vertical axis of the frame.

6. In combination with a frame and supporting means, a self-centering bail comprising a single length of wire having two ends forming tack members and a central seat portion in colinear alignment with and intermediate the tack portions, the portions of the bail intermediate the end portions and the central portion being of greater length than a straight line through the end portions and central portion and so fabricated as to permit relative movement between the end portions to adapt the bail to different widths of pictures and still maintaining the two end portions and the central portion in alignment whereby the end portions may be connected to the side frames of the picture at any desired points and still maintain the center of the bail colinear with the vertical axis of the frame.

7. In combination with a frame and supporting means, a self-centering bail comprising a single length of wire having two ends bent over to form tack members and a central seat portion shaped to receive said supporting means, said tack portions being turned in at right angles to the plane of the bail and perpendicular to the plane of the frame whereby said bail sets up a tension relative to said frame and supporting means and tends to maintain the bail and frame in coplanar alignment, the portions of the bail intermediate the end portions and the central portion being so fabricated as to permit relative movement between the end portions to adapt the bail to different widths of pictures.

8. In combination with a frame and supporting means, a single piece bail of flexible wire or the like, said bail being of irregular form to provide a seat portion centrally of the bail with substantially half portions thereof projecting laterally from the seat portion, the central seat portion and opposite half portions lying substantially in a common plane with the free ends of the half portions having penetrating devices projecting therefrom and substantially perpendicular to the plane of the bail for penetration into the frame, said seat portion adapted to be hooked onto the support, the opposite halves being flexible to accommodate different widths of frames, and said halves being simultaneously flexible whereby the bail is self-centered, the wire of the bail having inherent tension properties whereby the frame is held tensioned against the support means to frictionally tend to hold the frame from turning about said support.

GEORGE E. DEMOREST.